H. H. SCHUETTE.
THRESHING MACHINE.
APPLICATION FILED JULY 19, 1915.

1,180,443.

Patented Apr. 25, 1916.
2 SHEETS—SHEET 2.

UNITED STATES PATENT OFFICE.

HENRY H. SCHUETTE, OF NAPOLEON, OHIO.

THRESHING-MACHINE.

1,180,443.  Specification of Letters Patent.  Patented Apr. 25, 1916.

Application filed July 19, 1915. Serial No. 40,659.

*To all whom it may concern:*

Be it known that I, HENRY H. SCHUETTE, a citizen of the United States, and a resident of Napoleon, in the county of Henry and State of Ohio, have invented a certain new and useful Threshing-Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to grain threshing machines, and particularly to straw advancing and grain separating means therefor.

The object of my invention is the provision of certain improvements in machines of the class described, whereby to enhance the practicability and efficiency of the straw advancing and grain separating mechanisms thereof.

The invention is fully described in the following specification, and while, in its broader aspect, it is capable of embodiment in numerous forms, a preferred embodiment thereof is illustrated in the accompanying drawings, in which,—

Figure 1:
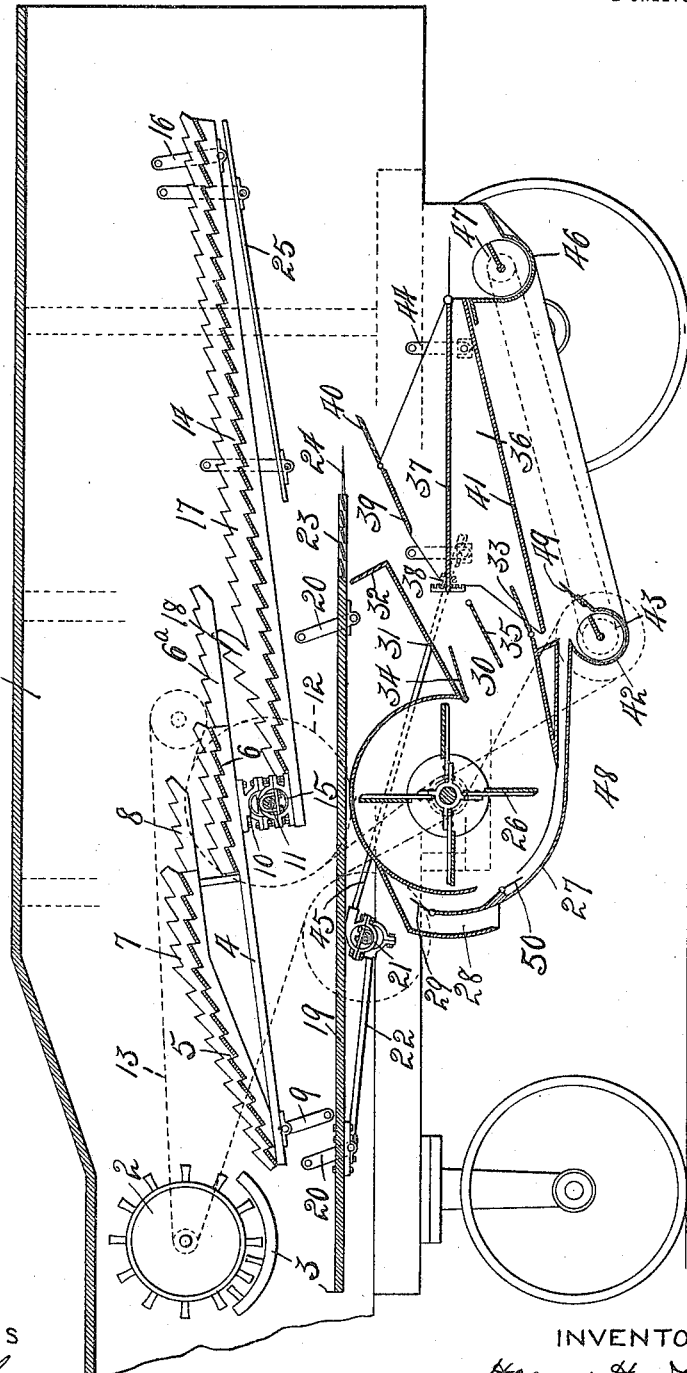
Figure 2:
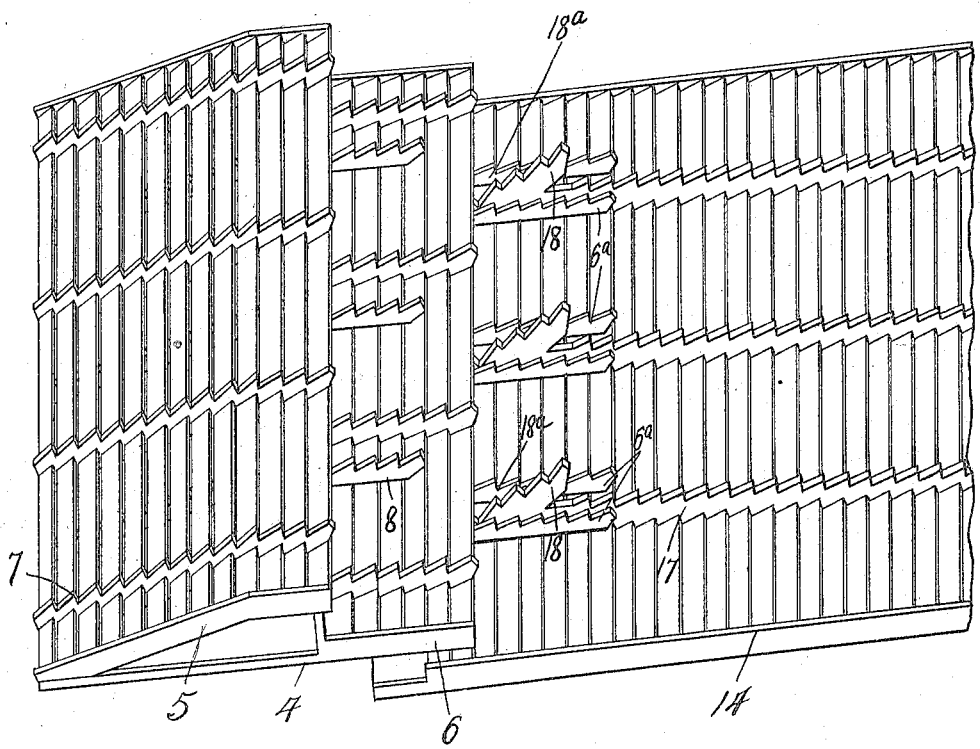

Figure 1 is a central vertical longitudinal section of a portion of a machine embodying my invention, and Fig. 2 is a perspective view of the straw racks in assembled position and with a part of one broken away.

Referring to the drawings, 1 represents the frame of the machine, which may be of any suitable design and of ordinary construction. In the following description it will be understood that the front end of the device is the discharging end while the rear end is the receiving end. Mounted in the rear end of the frame 1 is the customary threshing cylinder 2, which operates over the concaves 3. Immediately forward of the cylinder 2 is disposed a shaker-frame 4 having the straw-racks 5 and 6. The straw-rack 5 is disposed to the rear of the rack 6 and extends forward on an incline from the rear end of the shaker-frame 4, and has its forward end disposed in vertically spaced relation over the rear end of the straw-rack 6, as shown. Each of the straw-racks 5, 6 has its bottom portion of slat form with the slats inclined and spaced apart at adjacent edges to permit the downward passage of grain therebetween, and mounted over the slats in transversely spaced relation and extending longitudinally of the straw-racks are a plurality of fish-back flanges 7, which coöperate with the shaking action of the racks to advance the straw through the machine. The forward end of the straw-rack 5 is provided with forwardly projecting bars 8 of fish-back form, which extend over the rear end of the rack 6. The rear end of the shaker-frame 4 is swingingly carried at each side by a rocker-arm 9, which is pivoted to the respective side of the frame 1, and the forward end portion of the shaker-frame is carried by an eccentric 10, which is mounted on a transverse shaft 11. This shaft is disposed below the shaker-frame and has its ends journaled in the respective sides of the machine frame 1. One end of the shaft 11 carries a pulley 12 that is driven in the usual or any suitable manner by a belt 13. A third straw-rack 14 extends forward from under the forward end of the straw-rack 6 and is carried at its rear end by one or more eccentrics 15 on the shaft 11, whereby a turning of said shaft imparts shaking movements to the rack 14, as well as to the shaker-frame 4. The forward end of the straw-rack 14 is carried at each side thereof by a rocker-arm 16, which is pivotally suspended from the respective side of the machine frame 1. The rack 14 is of similar construction to the racks 5 and 6 in that it is provided with a slat-like bottom to permit the passage of grain therethrough and has its top provided with a plurality of fish-back flanges 17, which serve to advance the straw through the machine. The straw advancing flanges 17 are provided under the forward portions of the straw-rack 6 with fins 18, which are of toothed form on their top edges and adapted to work upward and forward between the fish-back bars 6ª projecting forward from the forward end of the rack 6, when reciprocating movements are imparted to the racks 6 and 14. It will be noted that the eccentrics 10 and 11 are so arranged on the shaft 11 that the racks 6 and 14 will alternately move toward and away from each other and backward and forward so that the fins 18 in their forward or straw advancing movements will project between and above the bars 6ᵃ and in their rearward or return movements will be disposed below said bars. It is found that the provision of the fins 18 and the projecting of the same through the rack 6 or between the bars 6ᵃ thereof during the straw advancing movement of the rack 14 and the rearward movement of the rack 6 will very materially facilitate the advancing of the straw through the machine and prevent a clogging thereof.

19 is a grain-bottom, which extends under the threshing mechanism and separating straw-racks 5 and 6 and the rear end of the straw-rack 14. The forward and rear ends of the grain-bottom 19 are supported for swinging movements longitudinally of the machine by sets of rocker arms 20 carried by the sides of the machine frame 1. A shaft 21, which is journaled transversely of the machine below the grain-bottom 19, has eccentric-rod connection 22 with the rear end portion of the grain bottom whereby longitudinal shaking movements are imparted to said grain bottom by a rotation of the shaft 21. The forward end portion of the grain bottom 19 is provided with a grain-pan 23 and in advance of such grain-pan with forwardly projecting fingers 24. A grain board or bottom 25 is swingingly suspended under the forward end portion of the straw rack 14 to catch grain as it drops through the forward end portion of said rack and to direct it rearwardly to the grain-bottom 19, the member 25 terminating at its rear end over the grain-pan 23.

The blast fan 26 is located within a circular housing 27 below the central portion of the grain-bottom 19, and said housing is provided at its rear side with an upwardly and downwardly extending air inlet passage 28, which is controlled by a wing form of valve 29 located, in the present instance, at the upper end of the center partition of the passage. At the lower forward side of the housing 27 is provided an outlet or blast passage 30, the upper wall 31 of which extends upward and forward and terminates at its forward end in an upwardly turned flange 32 beneath the grain pan 23 at the rear edge thereof. The bottom wall of the blast passage 31 extends only a short distance from the housing 27 and terminates at its forward end in a pivoted blast board 33 which is adjustable to restrict or enlarge the blast passage 30, as is also a forwardly projecting blast board 34, which is pivoted to the upper wall of the passage 30 at the rear or inner edge thereof. A blast board 35 is disposed intermediate of the blast boards 33 and 34 and is pivoted at its forward edge, as shown. The provision of the adjustable blast boards or gates 33, 34 and 35 in the blast passage 30 in the arrangement shown and described permits a perfect control of the air blast through said passage.

36 is a shaker-frame which is mounted immediately in advance of the air blast passage 30 and carries a riddle or sieve 37 in position to intercept a portion of the air blast from said passage provided the blast boards or gates 33 and 35 are properly adjusted for that purpose, as shown in the drawing. The riddle or sieve 37 is preferably pivoted at its forward end to the shaker-frame 36, and has its rear end in vertically adjustable connection with the shaker-frame through the medium of a rack-bar and pinion connection 38, thus enabling the rear end of the sieve to be raised or lowered relative to the forward or pivoted end of the blast board or gate 35. The riddle or sieve 37 has its rear end portion disposed below the grain-pan 23, whereby grain dropping therethrough is deposited on said riddle.

An inclined divider-board 39 for the air blast is fixedly carried by the shaker-frame 36 above the rear end portion of the riddle 37 and below the forward end portion of the grain-pan 23, and serves to intercept a portion of the grain dropping from the grain-pan 23 and to direct it onto the rear end portion of the riddle. Pivoted to the forward end of the divider part 39 is a divider-board 40 which is adjustable to regulate the quantity of the air blast which flows over or under the divider board. A raising of the divider board 40 restricts the air passage between the divider board and forward end of the grain bottom 19 and causes more grain and coarse matter to flow down the board than would otherwise be the case, and a lowering of said board permits coarse matter to blow over the top of the board when the board is raised. The shaker-frame 36 is provided below the riddle 37 in vertically spaced relation thereto with a rearwardly declining grain-bottom 41, which preferably terminates at its rear end slightly below the inner end portion of the blast board or gate 33 and over the customary grain trough 42 in which is mounted the grain auger 43. A space is provided between the forward ends of the riddle 37 and bottom 41 to permit the passage of an air blast therebetween.

The shaker-frame 36 is carried for shaking or swinging movements longitudinally of the machine by two sets of rocker arms 44 which are pivotally suspended from respective sides of the machine frame. A rod 45 extends from the shaker-frame 36 and has eccentric connection with the shaft 21 whereby a rotation of said shaft imparts shaking movements to the shaking-frame.

The chaff and coarse matter, which is blown from the grain, as it drops from the grain-pan 23 onto the riddle 37 and through said riddle to the bottom 41, is blown forward and the heavier particles thereof drop into the tailing trough 46 in which the tailing auger 47 is mounted, as is well understood in the art.

The bottom of the fan housing 27 is provided with a shallow blast passage 48, which opens at its rear end into the rear portion of the fan chamber and at its forward end over the grain trough 42 in position to discharge a blast of air through the grain as it drops from the shaker frame 36 into the grain trough. The discharging of this air blast across the grain in this manner causes any chaff and dust remaining in the grain to be blown therefrom over the side flange 49 of the grain trough. A gate valve 50 is disposed at the inner end of the blast passage 48 and controls the admission of air thereto.

It will be understood that the cylinder 2, eccentric shafts 11 and 21, fan 26 and augers 43 and 46 are driven in the usual or any desired manner, as well understood in the art, and as indicated by dotted lines in the drawings.

While I have herein shown and described one specific embodiment of my invention for illustrative purposes, and have disclosed and discussed in detail the construction and arrangement incidental to one specific application thereof, it is to be understood that the invention is limited neither to the mere detail or relative arrangement of the parts, nor to its specific application herein shown, but that extensive deviations from the illustrated form or embodiment of the invention may be made without departing from the principles thereof.

Having thus described my invention, what I claim as new, and desire to secure by Letters Patent, is,—

1. In a machine of the class described, a pair of straw racks mounted for opposed reciprocatory movements and having portions disposed one over the other, the lower of said portions having fin like members which intermittently project through the upper of said portions and facilitate the advancing of straw thereover.

2. In a machine of the class described, a pair of straw-racks mounted for longitudinal reciprocatory movements, one of said racks projecting over the rear end portion of the other rack and having lengthwise extending open spaces and the lower rack having fin-like members projecting from its top in position to have successive forward straw feeding movements through the open spaces in said other rack when the racks are reciprocated.

3. In a machine of the class described, a shaft, an upper straw-rack eccentrically mounted on said shaft and having a portion extending forward therefrom and provided with lengthwise extending open spaces, a lower straw-rack eccentrically carried at its rear end portion by said shaft and having fin-like members projecting from its top in register with said open spaces and operable by relative reciprocating movements of said racks when the shaft is rotated to successively project through said open spaces and impart forward feeding movements to matter passing over the upper rack.

In testimony whereof, I have hereunto signed my name to this specification.

HENRY H. SCHUETTE.

Copies of this patent may be obtained for five cents each, by addressing the "Commissioner of Patents, Washington, D. C."